(12) United States Patent
Wang et al.

(10) Patent No.: US 11,513,507 B2
(45) Date of Patent: Nov. 29, 2022

(54) SYSTEMS AND METHODS FOR DISTRIBUTED CONTROL OF MANUFACTURING PROCESSES

(71) Applicant: Accenture Global Solutions Limited, Dublin (IE)

(72) Inventors: Zhijie Wang, Fremont, CA (US); Teresa Sheausan Tung, Tustin, CA (US); Kirby James Linvill, Santa Clara, CA (US)

(73) Assignee: Accenture Global Solutions Limited, Dublin (IE)

( * ) Notice: Subject to any disclaimer, the term of this patent is extended or adjusted under 35 U.S.C. 154(b) by 243 days.

(21) Appl. No.: 16/867,524

(22) Filed: May 5, 2020

(65) Prior Publication Data
US 2021/0349449 A1 Nov. 11, 2021

(51) Int. Cl.
*H04L 9/32* (2006.01)
*G05B 19/418* (2006.01)

(52) U.S. Cl.
CPC ... *G05B 19/4188* (2013.01); *G05B 19/41835* (2013.01); *G05B 19/41865* (2013.01); *G05B 19/41885* (2013.01); *H04L 9/3221* (2013.01)

(58) Field of Classification Search
CPC ..... G06Q 10/063114; H03L 7/23; H03L 7/10; H03L 1/023; H03J 3/08; H03J 1/0075;
(Continued)

(56) References Cited

U.S. PATENT DOCUMENTS 6,803,829 B2 * 10/2004 Duncan ..................... H03L 7/23
331/34
6,882,950 B1 4/2005 Jennion et al.
(Continued)

OTHER PUBLICATIONS

Keller, M. et al., "Overdrive: Making SPDZ Great Again," Cryptology ePrint Archive, Report 2017/1230, 2017, International Association for Cryptologic Research, https://eprint.iacr.org/2017/1230.pdf, last accessed May 5, 2020.
(Continued)

*Primary Examiner* — Samson B Lemma
(74) *Attorney, Agent, or Firm* — Norton Rose Fulbright US LLP (57) ABSTRACT

Embodiments of the present disclosure provide systems and methods for controlling a manufacturing process in a manner that protects sensitive information from misuse by different entities involved in the manufacturing process. According to the present disclosure, a blueprint providing information regarding subcomponents of a product to be manufactured may be provided to a synthesizer device. The synthesizer device may engage in two-party computation with IP providers to generate a set of machine commands, which may be encrypted, and then provide a message including the set of machine commands to a manufacturer device. The manufacturer device may obtain authorization from the IP provider(s) based on the message, where the authorization may enable the manufacturer device to configure a manufacturing process in accordance with the set of machine commands to manufacture the subcomponents of the product.

17 Claims, 5 Drawing Sheets

(58) Field of Classification Search
CPC .......... H03J 3/185; H03J 3/04; H03J 2200/10; H03B 5/1209; H03B 5/364; H03B 5/1228; H03B 5/1212; H03B 5/1253; H03B 2200/0038; H03B 2201/025; H03B 2201/0266; H03G 1/0029; H01L 23/5227; H01L 27/0248; H01L 27/08; H01L 2924/09701; H01L 2924/0002; H01L 2924/3011; H01L 2924/00; H03H 11/1291; H01F 17/0006; H01F 2021/125; H01F 17/0013; H01F 2017/0053; H03D 7/161; H03D 7/18; G05B 19/4188; G05B 19/41835; G05B 19/41865; G05B 19/41885; H04L 9/3221

See application file for complete search history.

(56) References Cited

U.S. PATENT DOCUMENTS

| | | | |
|---|---|---|---|
| 6,904,449 B1* | 6/2005 | Quinones | H04L 67/53 709/219 |
| 8,136,168 B2 | 3/2012 | Cheng et al. | |
| 8,271,336 B2* | 9/2012 | Mikurak | G06Q 50/12 705/7.29 |
| 9,646,878 B2 | 5/2017 | Huff | |
| 2006/0041518 A1* | 2/2006 | Blair | G06F 16/116 705/80 |
| 2006/0178918 A1* | 8/2006 | Mikurak | G06Q 10/06315 705/7.31 |
| 2017/0054721 A1* | 2/2017 | Meriac | H04W 12/03 |

OTHER PUBLICATIONS

Archer, D.W et al., "From Keys to Databases—Real-World Applications of Secure Multi-Party Computation," Cryptology ePrint Archive, Report 2018/450, 2018, International Association for Cryptologic Research, https://eprint.iacr.org/2018/450.pdf, last accessed May 5, 2020.

* cited by examiner

SYSTEMS AND METHODS FOR DISTRIBUTED CONTROL OF MANUFACTURING PROCESSES

TECHNICAL FIELD

The present application relates to a manufacturing control system and more specifically to systems and methods for distributed control of manufacturing processes.

BACKGROUND

With the rise of trade globalization and technology advancement, manufacturing of end products and the supply chain(s) that support the manufacturing process have become increasingly complex. Such manufacturing processes and supply chains often involve many parties and components and may require certain participants to the process to share information with others. The information shared between participants may often involve sensitive or confidential information, which may include a first entity granting another entity with access to, or permission to use the intellectual property (IP) of the first entity. When this occurs, it is imperative that the owner of the IP maintain control over the use of the IP by those entities with which the IP owner shares IP information.

To illustrate, suppose that a first entity owns IP rights that are to be utilized to manufacture a particular product or sub-component of a product and that the first entity authorizes a manufacturer to utilize the IP rights to perform a production run of 100 units of the particular product or sub-component of the product. Without appropriate security measures, the manufacturer may use the IP rights disclosed by the first entity to perform the production run of the 100 units, but may execute additional production runs to produce more than the 100 units for which the manufacturer was authorized to use the IP rights. The possibility of such an occurrence stresses the need for systems that possess appropriate control mechanisms to limit the use of IP rights by third parties involved in a manufacturing process without placing excessive burdens on manufacturers that are to use the IP rights to manufacture products or sub-components of products. It is noted that some large enterprises are able to enforce certain IP rights protection mechanisms, but such enforcement is costly and may fail to produce adequate protections.

SUMMARY

The present application is directed to systems, methods, and computer-readable storage media providing functionality that enables secure distribution and exchange of information between various parties involved in a manufacturing process. Exemplary types of information that may be exchanged during the manufacturing process may include a blueprint of a product to be manufactured, machine commands configured to control one or more manufacturing tools, processes, or machines to manufacture subcomponents of the product identified in the blueprint, a bill of materials (BOM), or other information.

Some of the information exchanged during the manufacturing process may involve IP rights and the disclosed embodiments may provide functionality to control access to information that enables manufacturing processes to leverage those IP rights to manufacture subcomponents in a controlled manner, thereby preventing misuse of those IP rights and unauthorized manufacture of the subcomponents by the manufacturers. In aspects, a synthesizer device receives a blueprint that identifies a product to be manufactured, including identification of one or more subcomponents that collectively may be used to manufacture the product. The synthesizer device may analyze the blueprint to identify the different subcomponents, as well as one or more IP owners having IP rights covering the different subcomponents. The synthesizer device may translate the blueprint into sets of machine commands that may be used to manufacture the subcomponents. Each subcomponent may be associated with a set of commands and the sets of commands may be encrypted and provided to a manufacturer device.

The manufacturer device may receive the encrypted sets of commands and utilize the commands to manufacture the product identified in the blueprints. For example, the sets of commands may be decrypted using authorization information provided by the IP owners and then used to configure machines, tools, or other manufacturing processes to produce the subcomponents associated with the sets of commands. Once the subcomponents are manufactured, the subcomponents may be used to assemble or otherwise manufacture the product identified in the blueprint, such as the product. The authorization information received from the IP providers may enable the manufacturer to decrypt different ones of the sets of machine commands. For example, authorization information received from a first IP provider may enable manufacture of a first subcomponent associated with IP rights owned by the first IP provider, and authorization information received from a second IP provider may enable manufacture of a second subcomponent associated with IP rights owned by the second IP provider. In this manner, IP owners may control which manufacturers are able to access machine commands that may be used to manufacture subcomponents covered by their IP rights.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the implementations illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Technology has made significant advances over the past several decades, which has allowed digitization of information and automation to flourish. As a result of these technology advancements, many products manufactured today are initially designed using digital blueprints. These blueprints may include Eagle files for printed circuit board (PCB) or computer-aided design (CAD) drawings for mechanical parts or other products. Computer aided machining (CAM) processes may then use these digital blueprints to control one or more aspects of a manufacturing process. The disclosed systems and methods provide processes that take a digital blueprint of a final product to be manufactured, which may contain many subcomponents sourced from different entities, and manufacture it a manner that provides security and protection of IP rights of third parties to the manufacturing. In addition to incorporating measures to preserve IP rights, the disclosed systems and methods also provide features that enable manufacturers to protect third party IP or other sensitive information.

Figure 1:
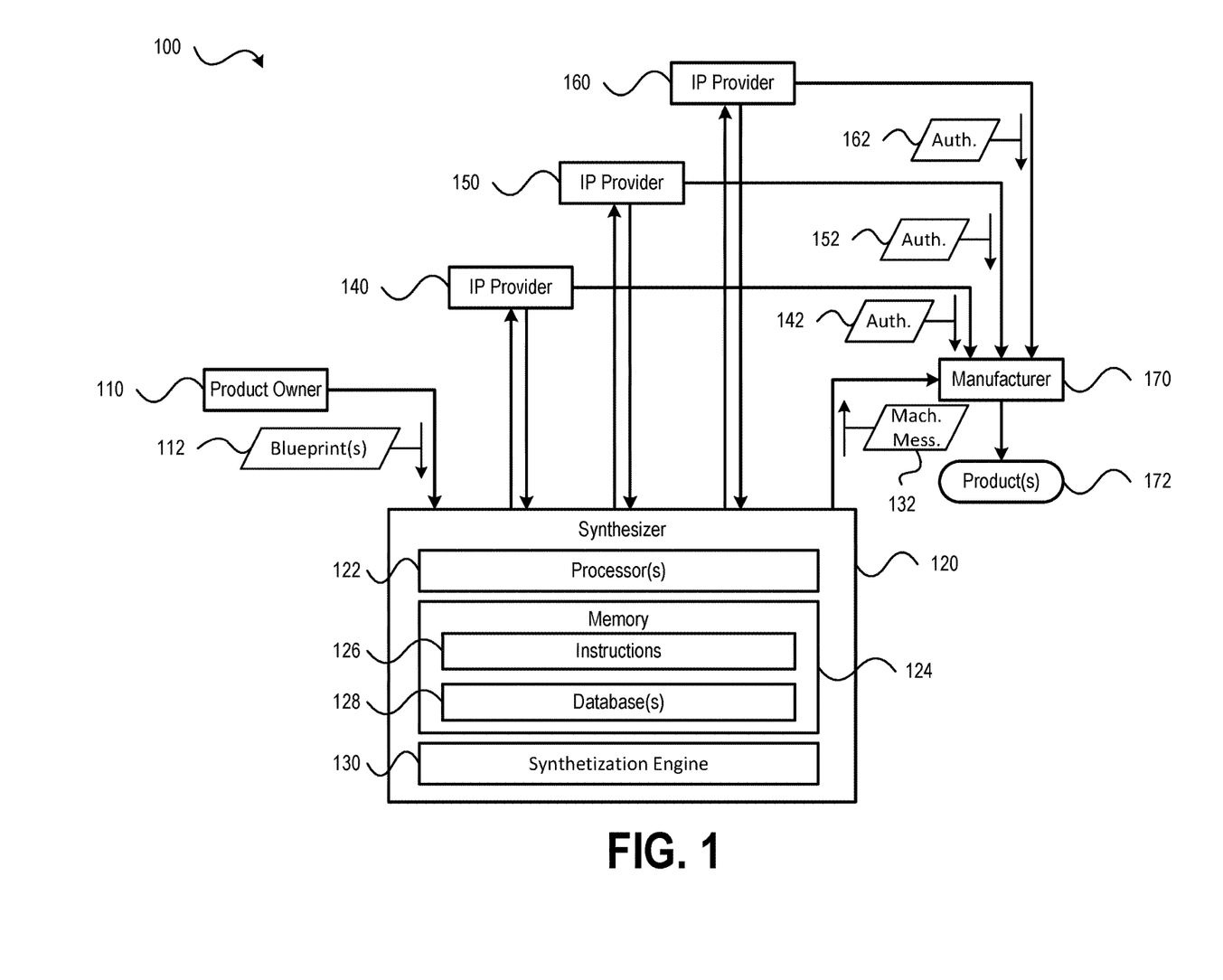
FIG. 1 is a block diagram of a system providing distributed control of a manufacturing process in accordance with embodiments of the present disclosure.

Referring to FIG. 1, a system providing distributed control of a manufacturing process in accordance with embodiments of the present disclosure is shown as a system 100. As shown in FIG. 1, the system 100 may include product owner device 110, a synthesizer device 120, a plurality of IP provider devices 140, 150, 160, and a manufacturer device 170. As described in detail herein with reference to FIGS. 1-5, operations of the system 100 may provide functionality that enables confidential data distribution between parties involved in a manufacturing process and allows a party sharing data to exert more control over how the shared data is used.

The product owner device 110 may be controlled and operated by a product owner, which is an entity that designs an original digital blueprint of a product to be manufactured. The blueprint may be a declarative data object that identifies many subcomponents and includes information that identifies interconnects between the subcomponents. Exemplary interconnects may include relative positions, wiring of pin connections (e.g., for integrated circuit (IC) chips), and relative layouts of devices on a circuit board. The blueprint may serve as the skeleton for a product to be manufactured and may contain metadata in an encrypted or unencrypted form that may be processed by the synthesizer device 120, as described below. It is noted that the product designed by the product owner may not be a completely new design and may involve a combination or integration of products or subcomponents that may have been designed by a third party. For example, a product owner may create a blueprint for a new bicycle and the bicycle design may include tires, a frame, a brake system, one or more reflectors, etc. The product owner may create the frame, but third party entities may have designed the tires, the brake system, the one or more reflectors, or other subcomponents that are included in the blueprint for the bicycle identified in the blueprint created by product owner device 110. In such a scenario, the product owner may own the rights to the digital blueprint designed using the product owner device 110, but that design or blueprint may incorporate subcomponents that involve IP rights owned by third parties, such as IP rights owned by the third parties that designed the tires, the brake system, the one or more reflectors, etc. In aspects, the blueprint produced by the product owner device 110 may be generated based on a simple declarative description or some other type of specification of the subcomponents of the third parties. It is noted that FIG. 1 illustrates one synthesizer device 120 for purposes of illustration, rather than by way of limitation and that the system 100 may include more than one synthesizer device according to aspects of the present disclosure.

The synthesizer device 120 may be operated by a party that provides computational infrastructure and a set of protocols to translate digital blueprints into machine commands, such as commands that may be provided to a manufacturing control system to control operations of one or more manufacturing devices or systems. For example, machines used in manufacturing operations may be configured to operate based on a set of machine commands written in a particular coding language. As an example, the synthesizer device 120 may be configured to convert a digital blueprint, such as blueprint 112, received from the product owner device 110, into G-code, which is a computer numerical control (CNC) programming language used in computer-aided manufacturing to control automated machining tools. It is noted that G-code is described herein for purposes of illustration, rather than by way of limitation and that synthesizer devices according to embodiments of the present disclosure may translate blueprints into other types of command sets that may be used by manufacturing tools and machines to control operations of a manufacturing process. In an aspect, the particular programming language or command set may be determined based on information received from the manufacturers (e.g., the manufacturer device 170, where the information provided to the synthesizer device 120 may include software, algorithms, and documentation for proprietary machine instrumentation commands associated with the manufacturing equipment of the manufacturers. It is noted that FIG. 1 illustrates one product owner device 110 for purposes of illustration, rather than by way of limitation and that the system 100 may include more than one product owner device according to aspects of the present disclosure.

In FIG. 1, a plurality of IP provider devices are shown, including IP provider devices 140, 150, 160. Each IP provider device of the plurality of provider devices may be operated and owned by a different entity, referred to as an IP provider. Each IP provider may own IP related to one or more products or subcomponents that may be used in manufacturing processes and each IP provider may authorize one or more manufacturers to use their respective IP rights to manufacture products that incorporate the products or subcomponents covered by the IP rights. It is noted that FIG. 1 illustrates three IP provider devices 140, 150, 160 for purposes of illustration, rather than by way of limitation and that the system 100 may include more than three IP provider devices or less than three IP provider devices according to aspects of the present disclosure.

As shown in FIG. 1, the system 100 may also include a manufacturer device 170. It is noted that although referred to as a manufacturer device, the manufacturer device 170 may actually include multiple devices, machines, tools, and controllers suitable for controlling and performing various operations to manufacture a product. As briefly described above, the products manufactured by the manufacturer device 170 may integrate or otherwise incorporate subcomponents associated with IP rights held by one or more of the IP providers corresponding to the plurality of IP provider devices. Additionally, the products manufactured by the manufacturer device 170 may be specified in a blueprint (e.g., blueprint 112) generated by the product owner device 110, and the blueprint may be translated into a set of machine commands by the synthesizer device 120, where the set of machine commands may be provided to the manufacturer device 170 by the synthesizer device 120 (e.g., as a machining message 132). While the description of the system 100 above has provided an overview of operations of the system 100, a more detailed description of the system 100 and the operations of product owner device 110, the synthesizer device 120, the plurality of IP provider devices, and the manufacturer device 170 is provided below.

It is noted that although not shown in FIG. 1, the product owner device 110, each of the plurality of IP provider devices (e.g., the IP provider devices 140, 150, 160), and the manufacturer device 170 may include components similar to the components illustrated with respect to the synthesizer device 120. For example, each of these devices may include one or more processors, a memory, one or more I/O devices, one or more network communication interfaces, and the like. Additionally, the memory of each device may store instructions that, when executed by the one or more processors, cause the one or more processors to perform the operations described herein with respect to the product owner device 110, the each of the plurality of IP provider devices (e.g., the IP provider devices 140, 150, 160), and the manufacturer device 170. Further, the memories of these different devices may each store one or more databases configured to support the operations of these devices within the system 100, as described in more detail below.

As shown in FIG. 1, the synthesizer device 120 includes one or more processors 122, a memory 124, and a synthetization engine 130. The one or more processors 122 may include one or more microcontrollers, application specific integrated circuits (ASICs), field programmable gate arrays (FPGAs), central processing units (CPUs) having one or more processing cores, or other circuitry and logic configured to facilitate the operations of the synthesizer device 120 in accordance with aspects of the present disclosure. The memory 124 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the synthesizer device 120 may be stored in the memory as instructions 126 that, when executed by the one or more processors 122, cause the one or more processors 122 to perform the operations described herein with respect to the synthesizer device 120, as described in more detail below. Additionally, the memory 124 may be configured to store one or more databases 128. Exemplary aspects of the one or more databases 128 are described in more detail below.

Although not illustrated in FIG. 1 for simplicity of the drawing, the synthesizer device 120 of embodiments may include one or more communication interfaces configured to communicatively couple the synthesizer device 120 to one or more networks via wired or wireless communication links established according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a 3rd Generation (3G) communication standard, a 4th Generation (4G)/long term evolution (LTE) communication standard, a 5th Generation (5G) communication standard, and the like). Additionally, the synthesizer device 120 may include one or more input/output (I/O) devices (not shown in FIG. 1), such as one or more display devices, a keyboard, a stylus, one or more touchscreens, a mouse, a trackpad, a camera, one or more speakers, haptic feedback devices, or other types of devices that enable a user to receive information from or provide information to the synthesizer device 120.

The synthetization engine 130 may be configured to process blueprint information received from the product owner device 110 via a network. For example, the product owner device 110 may transmit blueprint 112 to the synthesizer device 120. Upon receiving the blueprint 112, the synthesizer device 120 may store the blueprint 112 in the one or more databases 128, such as in a blueprint database. The blueprint 112 may include a set of descriptions of a product designed by the product owner device 110 and that is to be manufactured by the manufacturer device 170.

The synthetization engine 130 may be configured to analyze the blueprint 112 to identify the various subcomponents of the product and identify one or more IP owners that own IP rights with respect to the subcomponents. In an aspect, information identifying IP owners for each subcomponent may be included in the blueprint 112. For example, the entity operating the product owner device 110 may negotiate with the IP owners owning IP rights covering any of the subcomponents of the product described by the blueprint prior to transmitting the blueprint 112 to the synthesizer device 120, and the blueprint 112 may include information that maps each subcomponent to one of the IP provider devices 140, 150, 160. In an additional or alternative aspect, the one or more databases 128 may include a subcomponent/IP mapping database storing information that identifies a plurality of subcomponents and mapping information that maps each subcomponent of the plurality of subcomponents to an IP provider that owns IP rights for the corresponding subcomponent. The synthetization engine 130 may be configured to determine one or more subcomponents included in the blueprint 112 and then map those subcomponents to the plurality of IP providers using the mapping information stored in the one or more databases 128 (e.g., at the subcomponent/IP mapping database). The identification of the subcomponents may also serve to partition the blueprint 112 into different sections. For example, the synthetization engine 130 may partition the blueprint 112 into one section for each subcomponent (e.g., a blueprint identifying 3 subcomponents associated with 2 IP providers may be partitioned into 3 sections, one section for each subcomponent) or may partition the blueprint 112 into sections based on the IP providers associated with the identified subcomponents (e.g., a blueprint identifying 3 subcomponents associated with only 2 IP providers may be partitioned into 2 sections, one section for each of the two IP providers).

The synthetization engine 130 may communicate (e.g., via a secure network communication link) with at least one IP provider of the plurality of IP providers to secure computation of machine commands that may be provided to the manufacturer device 170. For example, having identified the one or more subcomponents included in the blueprint 112 and the IP associated each of the one or more subcomponents, the synthetization engine 130 may be configured to generate a set of machine commands for each subcomponent. The set of machine commands for a particular subcomponent may be provided in format compatible with the manufacturer device 170 (or one or more manufacturing tools or machines of the manufacturer device 170). In an aspect, the machine commands may include a manufacturing instructions set comprising G-code, which is a computer numerical control (CNC) programming language. However, it is noted that the machine commands may also specified in other formats and G-code is described for purposes of illustration, rather than by way of limitation.

After generating a set of machine commands for each section of the blueprint 112, the synthesizer device 120 may compile the set(s) of machine commands into machining message that may be provided to the manufacturer device 170, such as machining message 132. The different sets of machine commands may each be encrypted using a different cryptographic key. To illustrate, as part of the secure computation of machine commands, the synthetization engine 130 may communicate with each IP provider having IP rights to a subcomponent identified in the blueprint 112 to obtain a cryptographic key for use in encrypting the generated machine commands. If the blueprint 112 identifies subcomponents associated with the IP provider device 140 and the IP provider device 150, the synthetization engine 130 may generate a set of machine commands for each of the subcomponents and then obtain a cryptographic key from each of the IP provider devices 140, 150. The cryptographic key obtained from the IP provider device 140 may be used to encrypt the set(s) of machine commands generated for the subcomponents associated with the IP provider device 140 and the cryptographic key obtained from the IP provider device 150 may be used to encrypt the set(s) of machine commands generated for the subcomponents associated with the IP provider device 150. It is noted that multiple cryptographic keys may be obtained from a single IP provider device in some aspects. For example, where a blueprint identifies two or more subcomponents corresponding to a single IP provider, a different cryptographic key may be obtained from the IP provider device for each different set of machine commands generated (e.g., if two subcomponents are identified, two sets of machine commands may be generated and two cryptographic keys may be obtained, one cryptographic key for each set of machine commands). The IP provider devices may be configured to retain decryption keys that may be used to decrypt information encrypted with the cryptographic keys provided to the synthesizer device 120. In an additional or alternative aspect, the synthetization engine may be configured to generate the cryptographic key(s) used to encrypt the set(s) of machine commands derived from the blueprint 112 and provide a corresponding decryption key to the IP provider(s) corresponding to the subcomponent(s) specified in the set(s) of machine commands. In an aspect, the cryptographic keys and decryption keys may utilize public/private key encryption techniques. It is noted that the techniques for encrypting sets of machine commands described above have been provided for purposes of illustration, rather than by way of limitation and the other techniques may be used to encrypt and decrypt data in accordance with embodiments of the present disclosure.

As a result of the above-described processes, the synthetization engine 130 may generate a machining message 132 that includes information that may be provided to the manufacturer device 170 to manufacture the product specified in the blueprint 112. As briefly described above, the machining message may include multiple sets of machine commands and each set of machine commands may be encrypted using the same or different encryption keys. The machining message 132 may include information in addition to the set(s) of encrypted machine commands. For example, the machining message 132 may include information that identifies the IP provider associated with each set of encrypted machine commands. This information may be used by the manufacturer device 170 to obtain the appropriate decryption key from the IP provider in order to decrypt a set of machine commands. Once decrypted, the manufacturer device 170 may use the set of machine commands to configure one or more tools or machines that may be used to manufacture the product specified by the blueprint 112.

Other information that may be included in the machining message 132 may include a bill of materials (BOM), which may provide detailed information regarding the materials that are to be used in the manufacturing process. In an aspect, the BOM may be included in the blueprint 112. In an additional or alternative aspect, the BOMs for each subcomponent may be provided to the synthetization engine 130 by the corresponding IP providers during generation of the machining message. For example, upon identifying a subcomponent within the blueprint 112, the synthetization engine 130 may determine whether the BOM for that subcomponent is included in the blueprint 112. If the BOM is not included in the blueprint 112, the synthetization engine 130 may identify an IP provider associated with the subcomponent and request the BOM from the IP provider. In an aspect, the BOM may not be provided to the synthesizer device 120 or may be provided to the synthesizer device 120 in an encrypted form such that the synthesizer may include the encrypted BOM in the machining message 132, but may not read the contents of the BOM. Where the BOM is not provided to the synthesizer device 120, the machining message 132 may not include the BOM and the manufacturer device 170 may retrieve the BOM via communication with the IP provider directly. It is noted that whether an IP provider shares the BOM with the synthesizer device 120 may be up to each IP provider to decide. Thus, a machining message may include a BOM for a first subcomponent associated with a first IP provider in an unencrypted format, an encrypted BOM for a second subcomponent associated with a second IP provider, and may not include a BOM for a third subcomponent associated with a third IP provider. Further, a machining message may include an encrypted or non-encrypted BOM for a first subcomponent associated with a first IP provider and may not include a BOM for a second subcomponent associated with the first IP provider. Thus, it is to be understood that a single IP provider may provide a non-encrypted BOM for some subcomponents, while providing only encrypted BOMs or no BOMs to the synthesizer device 120 for other subcomponents.

Additionally, in systems where multiple synthesizer devices are provided, one synthesizer device may receive a non-encrypted BOM for a first subcomponent associated with a first IP provider, another synthesizer device may only an encrypted BOM for the first subcomponent associated with the first IP provider, and yet another synthesizer device of the system may not receive the BOM for the first subcomponent associated with the first IP provider. This type of scenario may be realized by different levels of trust between the IP providers and the operators of the various synthesizer devices of the system, where trusted synthesizer devices may receive a non-encrypted BOM and non-trusted synthesizer devices may receive an encrypted BOM or no BOM. Such capabilities may be beneficial as it enables IP providers to control access to potentially sensitive information based on trust levels between the IP provider, the manufacturer, and the synthesizer devices (e.g., a new synthesizer device may be considered untrusted and receive no BOM or an encrypted BOM, while a synthesizer device that has been operating with an IP provider for a long period of time may be trusted and provided with non-encrypted BOMs).

Once provided to the manufacturer, the manufacturer device 170 may analyze the metadata included in the machining message 132 to identify the different sets of encrypted machine commands and the IP providers associated with each set of machine commands. Once the IP providers are identified, the manufacturer device 170 may request authorization from an IP provider to access the machine commands for manufacturing the corresponding subcomponent. For example, suppose that the machining message 132 includes a first encrypted set of machine commands for manufacturing a subcomponent associated with the IP provider device 140, a second encrypted set of machine commands for manufacturing a subcomponent associated with the IP provider device 150, and a third encrypted set of machine commands for manufacturing a subcomponent associated with the IP provider device 160.

The manufacturer device 170 may transmit an authorization request to the IP provider devices 140, 150, 160 requesting authorization information for accessing the first, second, and third sets of machine commands, respectively. The IP provider device 140 may receive the authorization request and determine whether to transmit authorization information to the manufacturer device 170, where the authorization information enables the manufacturer device 170 to decrypt and utilize the first set of machine commands during a manufacturing process. In an aspect, the IP provider device 140 may determine whether to provide the authorization information based on whether the manufacturer device 170 has previously utilized the first set of commands to manufacture the corresponding subcomponent. To illustrate, suppose that the IP provider associated with the IP provider device 140 has authorized the manufacturer device 170 to manufacture 100 units of the subcomponent corresponding to the first set of machine commands, but has not provided authorization information to the manufacturer device 170 yet. In such a scenario, the IP provider device 140 may determine to authorize the manufacturer device 170 to access the first set of commands and transmit authorization information 142 to the manufacturer device 170. The authorization information 142 may include a one-time use decryption key that enables the manufacturer device to decrypt the first set of machine commands and after decryption is complete, the manufacturer device 170 may be able to configure a manufacturing process/tool/machine to produce the first subcomponent. Alternatively, if the IP provider device 140 determines to not grant the manufacturer device 170 with access to the first set of commands, the IP provider device 140 may not transmit the authorization information 142 to the manufacturer device 170, thereby preventing the use of the first set of commands by the manufacturer device 170. Similar operations may be performed by the IP provider devices 150, 160, where determinations to grant access to the second and third sets of machine commands, respectively, may result in transmission of authorization information 152, 162, respectively.

The IP provider devices may maintain one or more databases that track usage of machine commands by the manufacturer device 170. For example, each time the manufacturer device 170 requests authorization to use a set of machine commands the database may be updated to indicate whether access was granted or not. Additionally, the database may track the quantity of the subcomponents manufactured and take into account whether a threshold quantity of the subcomponents have been manufactured. To illustrate, suppose the manufacturer device 170 is authorized to manufacture 1,000,000 units of a subcomponent and that during a first production run by the manufacturer device 170 only 750,000 units were manufactured. If the manufacturer device requests authorization to produce the subcomponent again, the IP provider device may determine (e.g., based on information stored in the database) that 250,000 more units are authorized for production and may transmit additional authorization information. It is noted that the manufacturer device 170 may be configured to provide information to the IP provider device(s) regarding the quantity of units manufactured or other information, such as information that indicates a reason why less than the authorized amount of units was manufactured (e.g., due to a shortage of materials required for the manufacturing process, an equipment failure, a power outage, etc.) This information may be recorded in the database of the IP provider device and may be accounted for when determining to authorize additional use of the set of machine commands. In aspects, the authorization information provided by the IP provider device(s) may specify a quantity of units that may be produced upon receiving the authorization information. As the subcomponents are manufactured, one or more products may be produced (e.g., by assembling multiple subcomponents or a single subcomponent may be the final product), such as product 172.

In aspects, the IP provider devices may be configured to distribute authorization software to the manufacturer device 170. The authorization software may be configured to transmit requests for authorization information to the different IP provider devices and to control decryption of the sets of encrypted machine commands. For example, the authorization software may be provided as a sandbox application having an amount of memory allocated to it (e.g., a "sandbox" within the memory) and all information decrypted by the authorization software may be maintained within the sandbox. In this manner, the authorization provider may maintain control over use of the decrypted sets of machine commands, such as by deleting the decrypted information from the sandbox upon completion of the production run by the manufacturer device 170. Additionally, the authorization software may be configured to provide feedback to the IP provider devices regarding the number of units manufactured, whether any errors were encountered during the manufacturing process, or other types of information. In additional or alternative aspects, the manufacturer device 170 may simply be trusted to not improperly use the decrypted sets of machine commands and to delete the decrypted information after each production run.

In aspects, communications between different ones of the devices of the system 100 may involve verification of each device's identity prior to exchanging information. For example, the authorization request transmitted by the manufacturer device 170 to the IP provider device may include a message signed using a private key associated with the manufacturer device 170 and the IP provider may verify a received authorization request originated from the manufacturer device 170 by decrypting the message using a public key corresponding to the private key. Other devices within the system 100 may similar use public/private key encryption techniques to verify the identity of the involved devices prior to exchanging information. It is noted that other types of cryptographic techniques may be used by the system 100 to verify device identities and the examples above have been provided for purposes of illustration, rather than by way of limitation.

It is noted that in the context of the present application, the various entities described herein (e.g., the product owner, the operator of the synthesizer device 120, the IP providers, and the manufacturer(s)) may be a person or group of persons that has its own set of data that it wants to keep private from other parties, yet wants to jointly compute on the data with other parties. The demarcation here comes from a willingness to share one's data rather than needing to fall into traditional organization demarcations. Thus, if a party (whether a company, a sub-organization within a company, a team within a company, or even a single person) has data they don't want to reveal, they can be considered a separate and distinct party (e.g., from other companies, sub-organizations, teams, or persons).

As shown above, the system 100 provides various controls and mechanisms by which data may be shared among multiple entities or parties so that the combined efforts of all involved entities facilitate manufacture of a product in a secure manner. The various control mechanisms provided by the system 100 ensure that data may be securely shared and misuse of the shared information may be mitigated. Furthermore, the system 100 provides for feedback between manufacturers and the IP providers, thereby allowing IP providers to monitor use of their IP to ensure proper usage by the manufacturer device(s) and providing a mechanism to establish trust within the system 100. Additional aspects and exemplary embodiments of systems according to the present disclosure are described below with reference to FIGS. 2-5.

Figure 2:
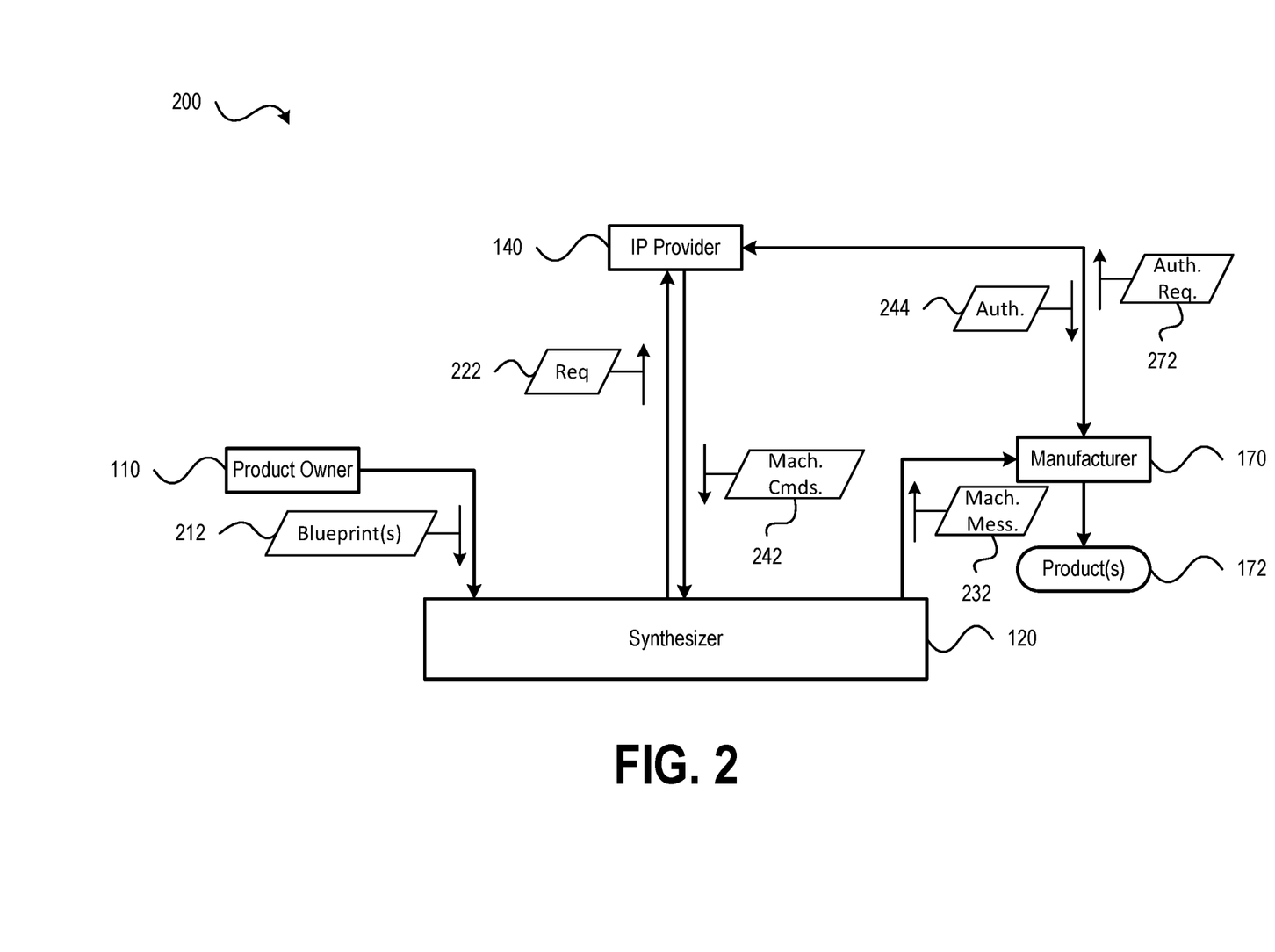
FIG. 2 is a block diagram of a system providing distributed control of a manufacturing process in accordance with embodiments of the present disclosure.

Referring to FIG. 2, a block diagram illustrating additional aspects of a system providing distributed control of a manufacturing process in accordance with embodiments of the present disclosure is shown. It is noted that FIGS. 1 and 2 include like reference numerals to reference like elements. For example, in FIG. 2, the product owner device 110, the synthesizer device 120, the IP provider device 140, and the manufacturer device 170 of FIG. 1 are shown. It should be understood that these devices may be configured in the manner described above with reference to FIG. 1 except for explicit differences apparent from the description of FIG. 2 that follows.

As with FIG. 1 above, the product owner device 110 may create a blueprint 212. The blueprint may be created as a text file, an .XML document, or some other format that is suitable for specifying aspects of a manufactured product. In the embodiment illustrated in FIG. 2, a BOM may not be considered sensitive information and may be included in the blueprint 212. Additionally, the blueprint 212 may include metadata or other information the identifies the subcomponents of the product and the IP providers corresponding to each identified subcomponent. The product owner device 110 may transmit the blueprint 212 to the synthesizer device 120.

Upon receiving the blueprint 212, the synthesizer device 120 may begin synthetization (e.g., using the synthetization engine 130 of FIG. 1). During synthetization, the synthetization engine 130 may analyze the blueprint 212 to identify the subcomponents of the product associated with the blueprint 212 and the IP providers associated with each identified subcomponent. Once the IP providers are identified, the synthetization device 120 may transmit a request for machine commands to each of the IP providers having a subcomponent identified in the blueprint 212. For example, as shown in FIG. 2, the synthesizer device 120 may transmit a request 222 to the IP provider device 140. The request 222 may include information identifying the subcomponent or subcomponents of the IP provider device 140. As a result of the request, the IP provider 140 may transmit a message 242 comprising machine commands to the synthesizer device 120. The synthesizer device 120 may encrypt the received machine commands as described above and may separate the encrypted machine commands into sections (e.g., on a per IP provider or per subcomponent basis). In an aspect, the machine commands received in the message 242 may be encrypted (e.g., by the IP provider device 140), thereby preventing the synthesizer device 140 from obtaining knowledge of the machine commands related to the subcomponent(s) of the IP provider.

The encrypted machine commands may be transmitted to the manufacturer device 170 as a machine command message 332. The manufacturer device 170 may receive the machine command message 332 containing the encrypted machine commands and may execute the machine commands by sections. To do so, the manufacturer device may first decrypt the machine commands for a particular section. To decrypt the machine commands, the manufacturer device 170 may transmit an authorization request 272 containing a cipher text and an identifier to the corresponding IP provider for decryption. In an aspect, the cipher text may correspond to the encrypted machine commands or a subset of the encrypted machine commands. The IP provider device 140 may receive the authorization request, decrypt the cipher text, and provide the decrypted information to the manufacturer device 170 as part of an authorization message 244.

As the decrypted machine commands are received, the manufacturer device 170 may use the machine commands to configure one or more manufacturing devices/tools/machines/processes and execute the manufacturing process. At the end of the execution of manufacturing process, the manufacturer device 170 may delete the decrypted machine commands from storage (e.g., the memory of the manufacturer device 170, which may include memories of the one or more manufacturing devices/tools/machines). Wiping the memory in this manner may prevent the final product 172 from being reverse engineered by simply re-executing the decrypted machine commands. However, it is noted that wiping the memory may not prevent the manufacturer from recording the operations of the various manufacturing devices/machines/tools during the authorized production run, and then simply replaying those operations based on the recorded operations (e.g., replay manufacturing).

Figure 3:
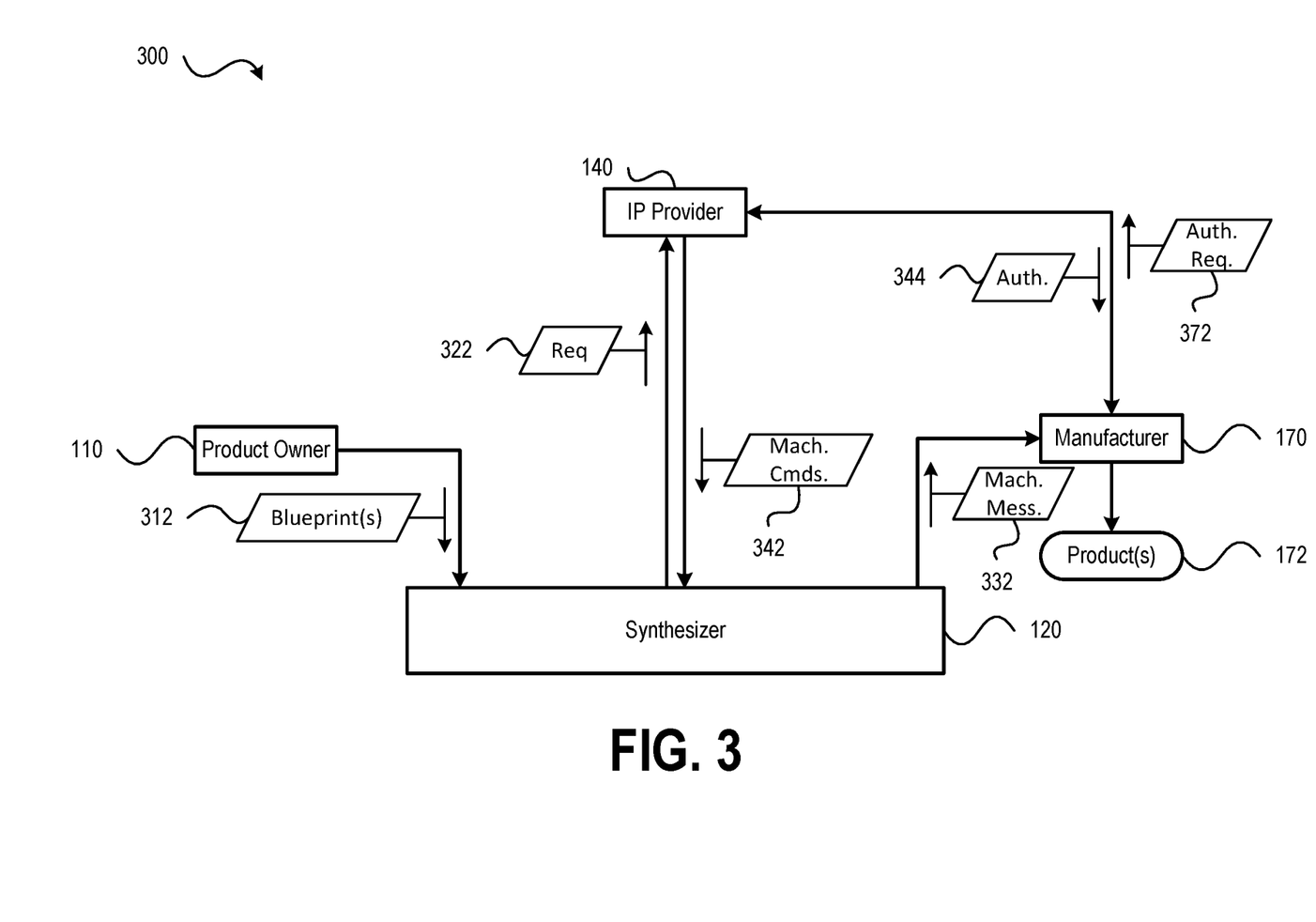
FIG. 3 is a block diagram of a system providing distributed control of a manufacturing process in accordance with embodiments of the present disclosure.

Referring to FIG. 3, a block diagram illustrating additional aspects of a system providing distributed control of a manufacturing process in accordance with embodiments of the present disclosure is shown. It is noted that FIGS. 1-3 include like reference numerals to reference like elements. For example, in FIG. 3, the product owner device 110, the synthesizer device 120, the IP provider device 140, and the manufacturer device 170 of FIGS. 1 and 2 are shown. It should be understood that these devices may be configured in the manner described above with reference to FIGS. 1 and 2 except for explicit differences apparent from the description of FIG. 3 that follows.

In the exemplary system shown in FIG. 3, operations of the product owner device 110 may be performed in a manner similar to the operations described above with reference to FIGS. 1 and 2. Additionally, the synthesizer device 120 may transmit a request 322 to the IP provider device 140. The request 322 may include information identifying the subcomponent or subcomponents of the IP provider device 140. As a result of the request, the IP provider 140 may transmit a message 342 comprising machine commands to the synthesizer device 120. In the embodiment illustrated in FIG. 3, the manufacturer is not trusted, which requires slight modifications to the operations of the synthesizer device 120, IP provider device 140, and the manufacturer device 170 relative to FIG. 2. In particular, during the synthetization phase, the synthetization engine of the synthesizer device 120 may construct zero knowledge queries based on the message 342 and may persist such queries into individual sections of a machine command message 332 transmitted to the manufacturer device 170 (e.g., instead of inserting the encrypted machine commands as described above with reference to FIG. 2). The manufacturer 170 may receive the machine command message 332 and, instead of sending cipher text for decryption, the manufacturer device 170 may execute the zero knowledge queries on a per section basis while operating in a secure enclave mode (e.g., a mode where responses to the queries are processed in a secure area of the hardware/software of the manufacturer device 170). Execution of the zero knowledge queries may include transmitting the zero knowledge queries to the IP provider device 140 via an authorization request 372. The IP provider device 140 may respond to the queries with the machine commands via an authorization message 344, which may include unencrypted data (e.g., machine commands) that may be processed by the secure enclave mode to perform the manufacturing process.

Figure 4:
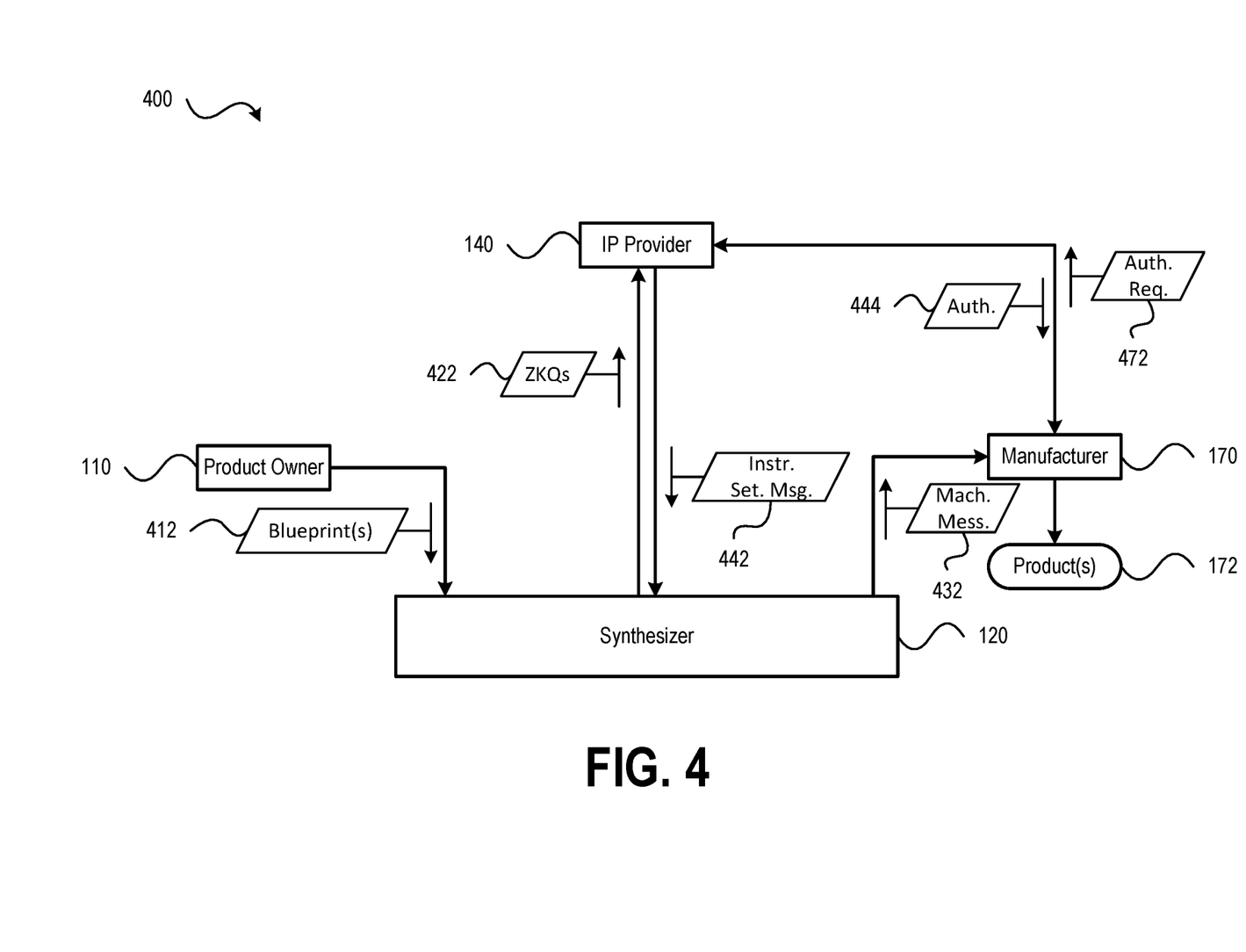
FIG. 4 is a block diagram of a system providing distributed control of a manufacturing process in accordance with embodiments of the present disclosure.

Referring to FIG. 4, a block diagram illustrating additional aspects of a system providing distributed control of a manufacturing process in accordance with embodiments of the present disclosure is shown. It is noted that FIGS. 1-4 include like reference numerals to reference like elements. For example, in FIG. 4, the product owner device 110, the synthesizer device 120, the IP provider device 140, and the manufacturer device 170 of FIGS. 1-3 are shown. It should be understood that these devices may be configured in the manner described above with reference to FIGS. 1-3 except for explicit differences apparent from the description of FIG. 4 that follows.

In the embodiment illustrated in FIG. 2, the product owner device provided a blueprint (e.g., the blueprint 212 of FIG. 2) to the synthesizer device 120 that included the BOM. In the embodiment illustrated in FIG. 4, the product owner device generates a blueprint 412, but the blueprint 412 does not include all of the details of the BOM. The BOM included in the blueprint 412 may contain information that identifies the IP provider(s), which may be included as plain text, but the specific components of the BOM may be replaced with zero knowledge queries. Like the embodiment of FIG. 2, the synthetization engine of the synthesizer device 120 may exchange signaling with the IP provider 140 to obtain the machine commands. However, unlike the embodiment of FIG. 2, the synthesizer device 120 transmits the zero knowledge queries (ZKQs) 422 to the IP provider device 140 and the IP provider device 140 responds to the ZKQs 422 by transmitting an instruction set message 442 that includes encrypted machine commands, thereby preventing the synthesizer device 120 from obtaining knowledge of the machine commands corresponding to the blueprint 412, which may be referred to as oblivious transfer of the machine commands. The instruction set message 442 may also contain a key that enables the synthesizer device 120 to obtain specific blocks from the encrypted instruction set—however, because the synthesizer device 120 does not know the contents of the BOM (e.g., product numbers, materials, etc.) the synthesizer device 120 may not obtain sufficient knowledge to enable misuse of the obtained information.

In an aspect, the key used by the synthesizer device 120 to obtain the specific blocks may be derived from information known to the synthesizer device 120. For example, the key may be constructed by the synthesizer device 120 or may be a piece of agreed upon information, such as a product serial number. Using the blocks obtained from the encrypted instruction set, the synthesizer device 120 may form a machine command message 432 that may be transmitted to the manufacturing device. The machine command message 432 may include the encrypted blocks obtained from the encrypted instruction set and the manufacturer device 170 may decrypt the contents of the machine command message 432 via transmission of an authorization request 472 to the IP provider device 140 (e.g., because IP provider 140 may be identified in the machine command message 432) and may receive back the decrypted machine commands via an authorization message 444 from the IP provider device 140, as described above with reference to FIG. 2.

This may enable a hierarchical system construction where each unit of execution can produce a component or product and the product of one step can be used as a sub-component or a raw material in another step. Such capabilities may allow a manufacturing protocol to be established that utilized execution chaining and aggregation involving multiple synthesizers and multiple manufacturers to complete manufacturing processes. To illustrate, suppose that a car manufacturing process involves four wheels, a chassis, and an engine. A blueprint for the car may be synthesized into an ensemble of three sub-blueprints: a wheel blueprint, a chassis blueprint, and an engine blueprint. When the master blueprint for the entire car is presented to the synthetization engine, the master blueprint is broken down into the three sub-blueprints and three executions of the operations described above may be performed. The first execution may be executed based on the wheel blueprint, the second execution may be executed on the chassis blueprint, and the third execution may be executed on the engine blueprint. The different executions of the sub-blueprints may be performed sequentially or concurrently. As a result of the three different executions of the sub-blueprints the wheels, the chassis, and the engine may be produced/obtained and are now manufactured components that are ready to be used during a final execution of master car blueprint (e.g., to assemble/produce the entire car).

It is noted that the exemplary processes described above with reference to FIGS. 1-4 may be combined and modified to produce different permutations of the above-described functionality. For example, the embodiments illustrated in FIGS. 3 and 4 may be combined to produce a system whereby the synthesizer device 120 obtains no knowledge of the contents of the BOM or the machine commands, as described above with reference to FIG. 4, and the manufacturer device 170 does not obtain information regarding the machine commands outside of the secure enclave mode. As another example, authorization messages may be routed to the IP provider devices via the synthesizer device 120, rather than directly being transmitted between the manufacturer device 170 and the IP provider devices. As another exemplary modification of the embodiments described above, the synthesizer device 120 or the IP provider devices may be communicatively coupled to the various manufacturing machines/tools/devices of the manufacturer device 170 and the machine commands may be streamed over a secure network connection directly to the manufacturing machines/tools/devices. Other combinations of the above-described functionality and processes may also be utilized. It is further noted that a product owner (e.g., an entity operating product owner device 110) may work with K synthesizer devices, MIP provider devices, and N manufacturer devices, where K≥1, M≥1, and N≥1, to manufacture products. Also, it is to be appreciated that as used herein, a product manufactured by one of the manufacturer devices may be a complete product (e.g., a product that may be purchased by a consumer) or may be a subcomponent of another product manufactured on behalf of or by another product owner. For example, memory devices may be formed from silicon wafers, integrated circuits, and other circuitry, which may be a complete product for a memory device product owner, but such memory devices may be subcomponents for a computing system product owner (e.g., because the computing system may include memory devices, but may also include other components, such as CPUs, motherboards, and the like).

Figure 5:
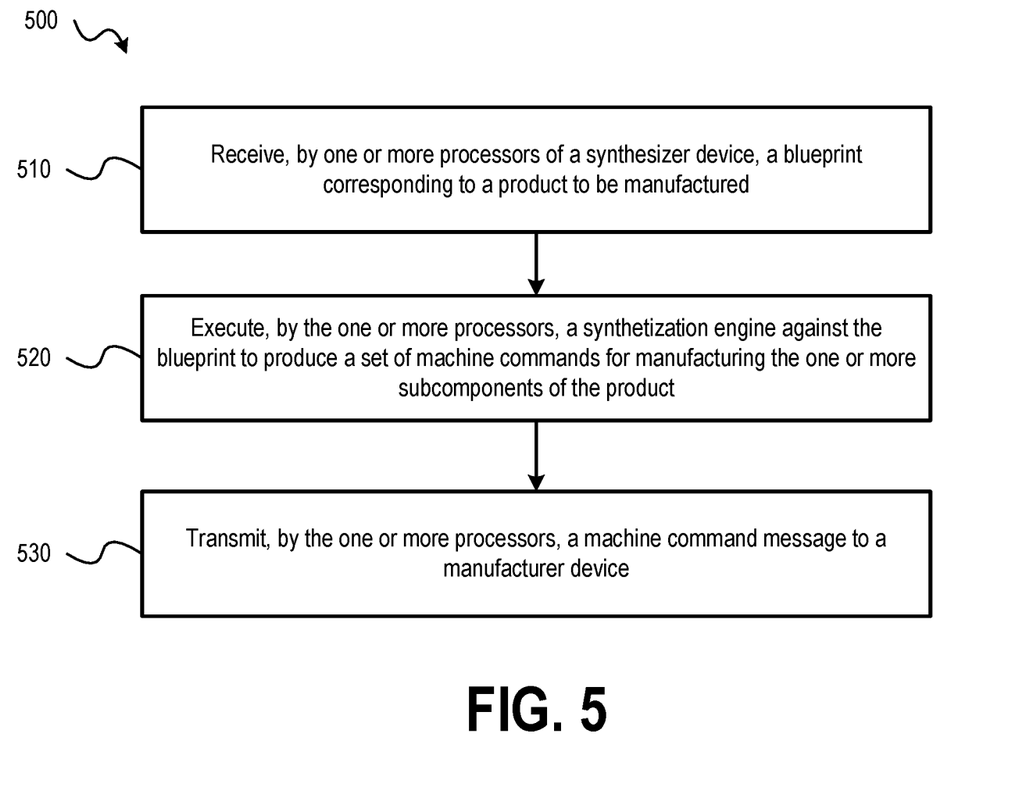
FIG. 5 is a flow diagram of a method for providing distributed control of manufacturing processes in accordance with embodiments of the present disclosure.

Referring to FIG. 5, a flow diagram of a method for providing distributed control of manufacturing processes in accordance with embodiments of the present disclosure is shown. In aspects, the operations of the method 500 may be stored as instructions (e.g., the instructions 126 of FIG. 1) that, when executed by one or more processors (e.g., the one or more processors 122 of FIG. 1), cause the one or more processors to perform the steps of the method. In aspects, the method 500 may be performed by a synthesizer device, such as synthesizer device 120 of FIG. 1.

At step 510, the method 500 includes receiving, by one or more processors of a synthesizer device, a blueprint corresponding to a product to be manufactured. The blueprint may include BOM information and may identify one or more IP providers associated with a plurality of subcomponents of the product. In aspects, the synthesizer device may be the synthesizer device 120 of FIG. 1 and the one or more processors may be the one or more processors 122 of FIG. 1. The BOM may include a list of raw materials and subcomponents or may include a set of zero knowledge queries, as described above with reference to FIGS. 1-4.

At step 520, the method 500 includes executing, by the one or more processors, a synthetization engine against the blueprint to produce a set of machine commands for manufacturing the one or more subcomponents of the product. In aspects, the synthetization engine may be the synthetization engine 130 of FIG. 1. Execution of the synthetization engine against the blueprint may include transmitting a machine command request to each of the IP providers. In aspects, the machine command request may be transmitted as described above with reference to FIGS. 1 and 2. Alternatively, the machine command request may be transmitted as described above with reference to FIGS. 3 and 4. Additionally, execution of the synthetization engine against the blueprint may include receiving, from each of the IP providers, machine command information specifying one or more commands. The one or more commands may comprise instructions or commands configured to control operations of a manufacturing device (e.g., a manufacturing machine, device, or tool) during manufacture of the product, such as to configure a manufacturing process for producing at least one of the plurality of subcomponents. Execution of the synthetization engine against the blueprint may also include partitioning the machine command information received from each of the IP providers into one or more groups of machine commands, each group of machine commands of the one or more groups of machine commands corresponding to at least one subcomponent. For example, as described above, a product may be associated with 3 different subcomponents and the synthetization engine may partition the machine command information received from the IP providers into 3 groups of machine commands—one group for each subcomponent—or may partition the groups on a different basis, such as one group for each IP provider.

At step 530, the method 500 includes transmitting, by the one or more processors, a machine command message to a manufacturer device. In an aspect, the manufacturer device may be the manufacturer device 170 of FIGS. 1-4. The machine command message may include the one or more groups of machine commands and may identify the IP providers corresponding to each group of machine commands. As explained above, the machine command message may be configured to facilitate communication between the manufacturer device and the IP providers to control a manufacturing process to produce the plurality of subcomponents. For example, as described in FIG. 2, the machine command message may contain information identifying IP providers and cipher texts. The manufacturer device may transmit the cipher texts to the corresponding IP providers and receive back machine command sets for configuring manufacturing devices to produce the plurality of subcomponents. Alternatively, as described above with reference to FIG. 3, the machine command message may include a plurality of zero knowledge queries that may be submitted to the IP providers to obtain the machine commands for configuring manufacturing devices to produce the plurality of subcomponents.

As can be appreciated from the description of FIGS. 1-5, the disclosed systems, methods, and computer-readable storage media may enable manufacturing of products in a manner that provides enhanced protection of sensitive data, such as IP data, and improve collaboration between different entities are involved in collaborative manufacturing processes. Such techniques may reduce IP misuse and theft while providing mechanisms to introduce trust concepts into manufacturing processes (e.g., by providing different mechanisms for obfuscating data during the manufacturing process from blueprint creation to subcomponent manufacturing and all processes in between). The disclosed processes enable certain levels of security to the IP transfer process, thereby improving license-design-fabrication-type processes by leveraging cryptographic primitives and secure multi-party computing techniques. Additionally, it is noted that the embodiment of FIG. 2 protects IP providers by preventing the product owner from using the IP in unauthorized ways; the embodiment of FIG. 3 enhances the embodiments of FIG. 2 by removing the trust of the manufacturer; the embodiment illustrated in FIG. 4 enhances the embodiment of FIG. 2 by keeping the detailed BOM information confidential from the synthesizer. Further, it is noted that the embodiments of FIGS. 3 and 4 may be utilized together, thereby providing protection to the IP owner when the manufacturer and the synthesizer are not considered trusted parties to the manufacturing process. Finally, although reference is made to utilization of zero knowledge queries in some embodiments, this terminology is not intended to be limiting and other oblivious transfer constructs may also be used according to embodiments of the present disclosure.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-5) may comprise processors, electronics devices, hardware devices, electronics components, logical circuits, memories, software codes, firmware codes, etc., or any combination thereof. In addition, features discussed herein relating to FIGS. 1-5 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIG. 5) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for controlling a manufacturing process comprising:
   receiving, by one or more processors of a synthesizer device, a blueprint corresponding to a product to be manufactured, wherein the blueprint comprises bill of materials (BOM) information and identifies intellectual property (IP) providers associated with a plurality of subcomponents of the product;
   executing, by the one or more processors, a synthetization engine against the blueprint to produce a set of machine commands for manufacturing the plurality of subcomponents of the product, wherein execution of the synthetization engine against the blueprint includes:
      transmitting a machine command request to each of the IP providers;
      receiving, from each of the IP providers, machine command information specifying one or more commands configured to control operations of a manufacturer device during manufacture of the product, wherein the machine command information received from each of the IP providers is encrypted; and
      partitioning the machine command information received from each of the IP providers into one or more groups of machine commands, each group of machine commands of the one or more groups of machine commands corresponding to at least one subcomponent; and
   transmitting, by the one or more processors, a machine command message to a manufacturer device, the machine command message comprising the one or more groups of machine commands and identifying the IP providers corresponding to each group of machine commands, the machine command message configured to facilitate communication between the manufacturer device and the IP providers to control a manufacturing process to produce the plurality of subcomponents, wherein the communication between the manufacturer device and the IP providers includes:
      transmitting a cipher text obtained from the encrypted information in the machine command message to each of the IP providers; and
      receiving decrypted machine commands from the IP providers, the decrypted machine commands executable by a manufacturing machine to manufacture one of the subcomponents.

2. The method of claim 1, wherein the machine command message comprises a plurality of zero knowledge queries, and wherein the communication between the manufacturer device and the IP providers includes transmitting the plurality of zero knowledge queries to each of the IP providers and receiving, from the IP providers, machine commands executable by manufacturing machines to manufacture the plurality of the subcomponents.

3. The method of claim 1, wherein the BOM included in the blueprint comprises a set of zero knowledge queries configured to obfuscate the plurality of subcomponents from the synthesizer device, and wherein the synthetization engine is configured to submit the set of zero knowledge queries to the IP providers to obtain the machine command information.

4. The method of claim 1, wherein the machine command information is not encrypted and the synthetization engine is configured to encrypt the machine command information prior to generating the machine command message.

5. The method of claim 1, wherein the synthesizer device is one of a plurality of synthesizer devices, and wherein the blueprint provided to the synthesizer device includes information for a first portion of the product, the first portion of the product comprising the plurality of subcomponents, and wherein a second blueprint associated with a second portion of the product is provided to another synthesizer of the plurality of synthesizer devices to manufacture additional subcomponents of the product.

6. A non-transitory computer-readable storage medium storing instructions that, when executed by one or more processors, cause the one or more processors to perform operations for controlling a manufacturing process, the operations comprising:
  receiving, at a synthesizer device, a blueprint corresponding to a product to be manufactured, wherein the blueprint comprises bill of materials (BOM) information and identifies intellectual property (IP) providers associated with a plurality of subcomponents of the product;
  executing a synthetization engine against the blueprint to produce a set of machine commands for manufacturing the plurality of subcomponents of the product, wherein execution of the synthetization engine against the blueprint includes:
    transmitting a machine command request to each of the IP providers;
    receiving, from each of the IP providers, machine command information specifying one or more commands configured to control operations of a manufacturer device during manufacture of the product, wherein the machine command information received from each of the IP providers is encrypted; and
    partitioning the machine command information received from each of the IP providers into one or more groups of machine commands, each group of machine commands of the one or more groups of machine commands corresponding to at least one subcomponent; and
  transmitting, from the synthesizer device, a machine command message to a manufacturer device, the machine command message comprising the one or more groups of machine commands and identifying the IP providers corresponding to each group of machine commands, the machine command message configured to facilitate communication between the manufacturer device and the IP providers to control a manufacturing process to produce the plurality of subcomponents, wherein the communication between the manufacturer device and the IP providers includes:
    transmitting a cipher text obtained from the encrypted information in the machine command message to each of the IP providers; and
    receiving decrypted machine commands from the IP providers, the decrypted machine commands executable by a manufacturing machine to manufacture one of the subcomponents.

7. The non-transitory computer-readable storage medium of claim 6, wherein the machine command message comprises a plurality of zero knowledge queries, and wherein the communication between the manufacturer device and the IP providers includes transmitting the plurality of zero knowledge queries to each of the IP providers and receiving, from the IP providers, machine commands executable by manufacturing machines to manufacture the plurality of the subcomponents.

8. The non-transitory computer-readable storage medium of claim 6, wherein the BOM included in the blueprint comprises a set of zero knowledge queries configured to obfuscate the plurality of subcomponents from the synthesizer device, and wherein the synthetization engine is configured to submit the set of zero knowledge queries to the IP providers to obtain the machine command information.

9. The non-transitory computer-readable storage medium of claim 6, wherein the machine command information is not encrypted and the synthetization engine is configured to encrypt the machine command information prior to generating the machine command message.

10. The non-transitory computer-readable storage medium of claim 6, wherein the synthesizer device is one of a plurality of synthesizer devices, and wherein the blueprint provided to the synthesizer device includes information for a first portion of the product, the first portion of the product comprising the plurality of subcomponents, and wherein a second blueprint associated with a second portion of the product is provided to another synthesizer of the plurality of synthesizer devices to manufacture additional subcomponents of the product.

11. A system for controlling a manufacturing process, the system comprising:
  a synthesizer device having one or more processors and a memory communicatively coupled to the one or more processors, wherein the one or more processors are configured to:
    receive a blueprint corresponding to a product to be manufactured, wherein the blueprint comprises bill of materials (BOM) information and identifies intellectual property (IP) providers associated with a plurality of subcomponents of the product;
    execute a synthetization engine against the blueprint to produce a set of machine commands for manufacturing the plurality of subcomponents of the product, wherein execution of the synthetization engine against the blueprint includes:
      transmitting a machine command request to each of the IP providers;
      receiving, from each of the IP providers, machine command information specifying one or more commands configured to control operations of a manufacturer device during manufacture of the product, wherein the machine command information received from each of the IP providers is encrypted; and
      partitioning the machine command information received from each of the IP providers into one or more groups of machine commands, each group of machine commands of the one or more groups of machine commands corresponding to at least one subcomponent; and
    transmit a machine command message to a manufacturer device, the machine command message comprising the one or more groups of machine commands and identifying the IP providers corresponding to each group of machine commands, the machine command message configured to facilitate communication between the manufacturer device and the IP providers to control a manufacturing process to produce the plurality of subcomponents, wherein the communication between the manufacturer device and the IP providers includes:

transmitting a cipher text obtained from the encrypted information in the machine command message to each of the IP providers; and receiving decrypted machine commands from the IP providers, the decrypted machine commands executable by a manufacturing machine to manufacture one of the subcomponents.

12. The system of claim 11, wherein the machine command message comprises a plurality of zero knowledge queries, and wherein the communication between the manufacturer device and the IP providers includes transmitting the plurality of zero knowledge queries to each of the IP providers and receiving, from the IP providers, machine commands executable by manufacturing machines to manufacture the plurality of the subcomponents.

13. The system of claim 11, wherein the BOM included in the blueprint comprises a set of zero knowledge queries configured to obfuscate the plurality of subcomponents from the synthesizer device, and wherein the synthetization engine is configured to submit the set of zero knowledge queries to the IP providers to obtain the machine command information.

14. The system of claim 11, wherein the synthetization engine is configured to encrypt the machine command information prior to generating the machine command message.

15. The system of claim 11, wherein the synthesizer device is one of a plurality of synthesizer devices, and wherein the blueprint provided to the synthesizer device includes information for a first portion of the product, the first portion of the product comprising the plurality of subcomponents, and wherein a second blueprint associated with a second portion of the product is provided to another synthesizer of the plurality of synthesizer devices to manufacture additional subcomponents of the product.

16. The system of claim 11, wherein the machine command message includes a plurality of cipher texts and identifiers corresponding to each cipher text of the plurality of cipher texts, each identifier mapping a particular cipher text to one of the subcomponents of the plurality of subcomponents, and wherein the cipher text and identifier for a data set that facilitates retrieval of one or more machine commands from the IP providers.

17. The system of claim 11, wherein the machine command information comprises encrypted information and one or more keys, and wherein the one or more processors are configured to extract portions of the encrypted information based on the one or more keys to generate the machine command message, the one or more groups of machine commands comprising the extracted portions of the encrypted information.

* * * * *